(12) United States Patent
Velupillai

(10) Patent No.: US 7,657,871 B2
(45) Date of Patent: Feb. 2, 2010

(54) METHOD AND SYSTEM OF MANAGING CONFIGURATION PROFILES OF A PLURALITY OF DEPLOYED NETWORK ELEMENTS

(75) Inventor: Manivannan Velupillai, Hoffman Estates, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 970 days.

(21) Appl. No.: 11/187,224

(22) Filed: Jul. 22, 2005

(65) Prior Publication Data
US 2007/0022418 A1 Jan. 25, 2007

(51) Int. Cl.
G06F 9/44 (2006.01)
G06F 9/45 (2006.01)

(52) U.S. Cl. .................. 717/121; 717/122; 709/203

(58) Field of Classification Search ......... 717/121–126, 717/176–177; 709/203–204
See application file for complete search history.

(56) References Cited

U.S. PATENT DOCUMENTS

| | | | | |
|---|---|---|---|---|
| 5,907,705 A * | 5/1999 | Carter | ................ | 717/122 |
| 6,012,088 A | 1/2000 | Li et al. | | |
| 6,256,773 B1 * | 7/2001 | Bowman-Amuah | ......... | 717/121 |
| 6,535,924 B1 | 3/2003 | Kwok et al. | | |
| 6,594,704 B1 | 7/2003 | Birenback et al. | | |
| 6,640,239 B1 * | 10/2003 | Gidwani | .............. | 709/203 |
| 6,701,514 B1 * | 3/2004 | Haswell et al. | ......... | 717/115 |
| 6,751,191 B1 | 6/2004 | Kanekar et al. | | |
| 7,096,459 B2 * | 8/2006 | Keller et al. | .............. | 717/124 |
| 7,103,874 B2 * | 9/2006 | McCollum et al. | ......... | 717/121 |
| 7,114,148 B2 * | 9/2006 | Irving et al. | ............. | 717/121 |
| 7,191,435 B2 * | 3/2007 | Lau et al. | ................ | 717/168 |
| 7,240,325 B2 * | 7/2007 | Keller | .............. | 717/104 |
| 7,257,644 B2 * | 8/2007 | Simonnet et al. | ......... | 709/238 |
| 7,278,134 B2 * | 10/2007 | Ricke | ............... | 717/123 |
| 7,337,435 B2 * | 2/2008 | Bell et al. | ............... | 717/136 |
| 7,472,376 B2 * | 12/2008 | Burcham et al. | ......... | 717/113 |
| 7,539,746 B2 * | 5/2009 | Bankier et al. | ......... | 709/224 |
| 2002/0163891 A1 | 11/2002 | Natarajan et al. | | |
| 2003/0117954 A1 | 6/2003 | De Neve et al. | | |
| 2004/0202171 A1 | 10/2004 | Hama | | |
| 2005/0021684 A1 | 1/2005 | Hsue et al. | | |

FOREIGN PATENT DOCUMENTS

WO   WO 03/048933 A1   6/2003

OTHER PUBLICATIONS

Yang et al, "A unified platform for data driven web applications with automatic client server partitioning", ACM WWW pp. 341-350, 2007.*
Decasper et al, "Router Plugins: A software architecture for next generation routers", IEEE/ACM Trans. on Networking, vol. 8, No. 1, pp. 2-15, 2000.*
Kim et al, "A client profile framework for providiing adapted contents in ubiquitous environments", ACM ICPS, pp. 181-184, 2008.*
Augustin et al, "Managing the follow line semantics to build large scale pervasive applications", ACM MPAC, pp. 1-8, 2005.*

* cited by examiner

Primary Examiner—Anil Khatri
(74) Attorney, Agent, or Firm—Brooks Kushman P.C.

(57) ABSTRACT

A method of managing configuration profiles for a plurality of network elements after the network elements have been deployed in a network. The method including retrieving configuration profiles from the network elements after the network elements have been deployed in the network; storing the retrieved configuration profiles in a database; and distributing one or more of the stored configuration profiles to one or more network elements experiencing fault conditions to facilitate the correction thereof.

5 Claims, 2 Drawing Sheets

METHOD AND SYSTEM OF MANAGING CONFIGURATION PROFILES OF A PLURALITY OF DEPLOYED NETWORK ELEMENTS

BACKGROUND OF THE INVENTION

1. Field of the Invention

The present invention relates to methods and system of managing configuration profiles of a plurality of deployed network elements.

2. Background Art

Configuration profiles and other parameters associated with operation of routers and other network elements deployed in a network may be manually backed up using a PCMIA card or other localized medium, which typically requires a technician or other experienced individual. If the router goes down or otherwise experiences a fault condition, its return to operation may be dependent on restoration of the configuration profile stored on the local PCMIA card.

Because the configuration profiles are stored locally, a technician must be dispatched to the router to instigate a manually restoration using the PCMIA card backup. The importance of these PCMIA backups is critical to insure there is a recent restoral point for the network element. If there is not a recent backup, much data can be lost.

DETAILED DESCRIPTION OF THE PREFERRED EMBODIMENT(S)

Figure 1:
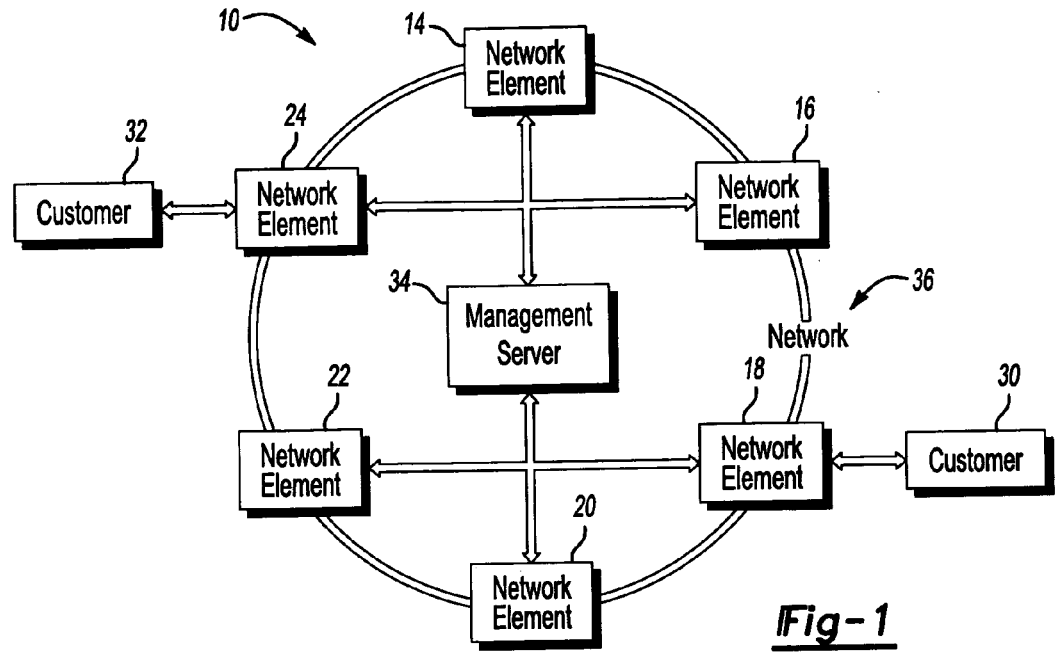
FIG. 1 illustrates a system in accordance with one non-limiting aspect of the present invention.

FIG. 1 illustrates a system 10 in accordance with one non-limiting aspect of the present invention. The system 10 may include a number of network elements 14-24 configured to facilitate servicing electronic services for a number of customers 30-32. The network elements 14-24 may be configured to interact with each other and the customers 30-32. A management server 34 may be provided to facilitate managing operation of the network elements 14-24.

A network 36 may be provided by the network elements 14-24 to facilitate electronic data transmissions therebetween. The network 36 may be a public telephone switching network (PSTN), advanced intelligent network (AIN), wireless intelligent networks (WIN), time division multiplex (TDM) network, packet switching or IP network, VoIP network, and the like. The network 36 may include any type of infrastructure for supporting the operation thereof, such as terrestrial or extraterrestrial, wireless or wireline line infrastructures and/or some combination thereof. The network 36 may be configured to transmit electronic data according to any protocol and standard, including TCP/IP, UDP, SONET, etc.

The network elements 14-24 may include any type of network element associated with a telecommunication, television, data, satellite, and/or cable system. For example, the network elements may be routers, gateways, hubs, central offices (COs), service switching points (SSP), soft switches, signal transfer points (STPs), service control points (SCPs), service nodes (SNs), service package applications (SPAs), mobile switching centers (MSCs), home location registers (HLRs), visitor location registers (VLRs), server offices, server switches, feature servers, application program interfaces (APIs), hubs, bridges, servers, and the like.

Figure 2:
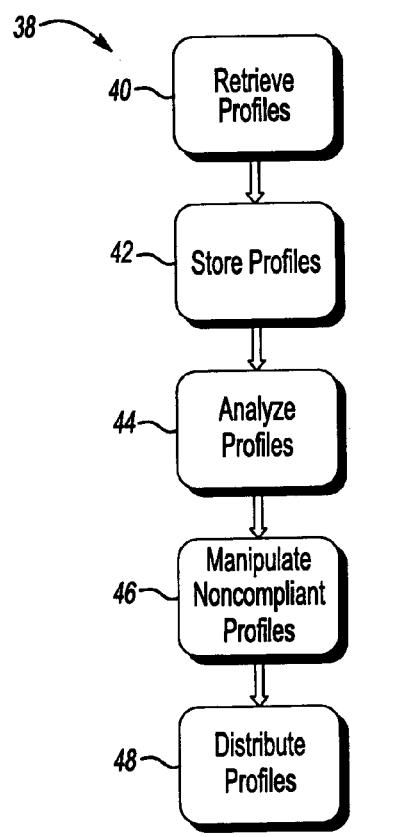
FIG. 2 illustrates a method of managing configuration profiles of the network elements in accordance with one non-limiting aspect of the present invention.

The management server 34 may include a tool (not shown) to facilitate managing operation of the various network elements 14-24. The tool may be configured to control operation of the management server 34 in such a manner as to facilitate controlling operation of the various network elements 14-24. In accordance with one non-limiting aspect of the present invention, the server 34 may be configured to communicate with the network elements 14-24 so as to facilitate managing configuration profiles associated therewith. The management server 34 may include or be configured to communicate with a database. The database may be configured to store electronic data for use by the server and/or network elements FIG. 2 illustrates a flowchart 38 of a method of managing configuration profiles of the network elements 14-24 in accordance with one non-limiting aspect of the present invention. The method may be executed by a tool included within the server 34 and/or by any other suitable device included within the system. The method may be embodied in a software program, algorithm, and/or other logical medium suitable for directing, controlling, manipulating, and performing the other operations associated with the execution thereof.

Block 40 relates to retrieving configuration profiles from one or more of the network elements 14-24. The configuration profiles generally relate to electronic data associated with the operation of the network elements 14-24. Each network element 14-24 may include a number of different operation characteristics and parameters for controlling the operation thereof. This information and other information associated with directing and controlling operation of the network elements 14-24 may be included with the configuration profile.

The configuration profile may be used to specify variables associated with the operation of the network elements 14-24. As one skilled in the art will appreciate, each network element 14-24 may have one or more different parameter settings and other variables depending on the operations associated therewith. For example, different routers in the system may have any number of different configuration profiles depending on the number of customer supported, performance and quality of service requirements, and the like. If the network elements 14-24 should experience a fault condition or experience other interruptions in the operation thereof, the configuration profile may be used to restore the operation thereof.

The tool may control the server 34 to poll the network elements 14-24 for the configuration profiles associated therewith. For example, the tool may be configured to periodically output instructions to the network elements 14-24 for requesting transport of their configuration profiles to the server 34 and/or the tool may issue instructions for configuring the network elements 14-24 to automatically transport their configurations profiles upon occurrence of a triggering event, such as on the first day of each calendar month and/or upon any changes thereto.

The configuration profiles may be retrieved after the network elements 14-24 are deployed in the system 10. This may be advantageous for retrieving changes in the configuration profiles made by technicians at a local level. For example, various network elements 14-24 may include a base or global configuration profile which allows it to initially operate and communicate when deployed in the system 10. This configuration profile, however, may be adapted once deployed to support particular operations and features, commonly a technician or other experienced individual may be used to adjust the parameters of the network element once deployed to conform its configuration profile to desired operation settings. By retrieving the configuration profiles after such deployment, the present invention is able to retrieve the particular configuration file used by the deployed network elements 14-24 after it has been locally provisioned after deployment.

Block 42 relates to storing the retrieved configuration profiles in a database. The database may be included on the server 34 or otherwise in communication therewith. It may be configured to support computation and other analysis of the configuration profiles. The configuration profiles may include a network element identifier which may be used in storing the configuration profiles on the database in a logical order. For example, configuration profiles associated with particular types of network elements 14-24 may be associated with each other to facilitate the analysis thereof.

Block 44 relates to analyzing the configuration profiles for compliance with desired management characteristics. The desired management characteristics may relate to various account, inventory, traffic, historical info, and other information which may be gleaned from the stored configuration profiles. The tool may be configured to automatically analyze the stored configuration files based on any number of algorithms associated with desired settings and features for the configuration profiles.

In general, the analyzing step may be used to determine whether the configuration profile corresponds to required operation settings and to troubleshoot the profiles if errors are found therein. For example, each profile may be individually analyzed by the tool or an operator thereof to determine whether the profile is in compliance with any number of different management requirements. Non-compliant configuration profiles may be flagged or otherwise designated, such through alerts or other messages being sent to a network administrator.

Block 46 relates to manipulating the non-compliant configuration profiles into compliance with the desired management characteristics. This may require manipulating one or more of the configuration profiles according to one or more different settings. In more detail, different desired management characteristics may be assigned to different network elements. Accordingly, the configuration profiles may need to be manipulated to correspond with the desired management characteristics associated with that particular type of network element 14-24.

To facilitate the manipulation process, the network element identifiers optionally included with the retrieved configuration profiles may be cross-referenced with various management characteristics. In this manner, the tool may lookup or otherwise locate the desired operation characteristics for the configuration profiles of each network element. Once manipulated, the manipulated configuration profiles may be stored in place of the originally downloaded configuration files.

Block 48 relates to distributing one or more of the stored configuration profiles to one or more the network elements 14-24. The distributed configuration profiles may be one of the originally downloaded profiles or a profile manipulated into compliance with the desired management characteristics. The tool may be configured to distribute the configuration profiles to the network elements associated therewith according to any number of triggers.

One trigger may relate to determining a fault condition for one of the network elements. The fault condition may be determined by the tool polling the network element for its current conditions and/or by the tool receiving a message from the network element, such as through an automatically fault reporting program included on the network element. The tool may then locate and distribute an appropriate configuration profile to the network element experiencing the fault condition.

As described above, the tool may periodically go to router and other network elements and extract all the configuration data and populate a separate database with this information. This automated process would negate the need for the manual technician process using the PCMIA card. Once this information is stored in separate data base, the present invention may be used to generate many reports based on the data that was taken from the router. You can generate accounting data, inventory, traffic info, historical info, and you would have a secure backup.

Figure 3:
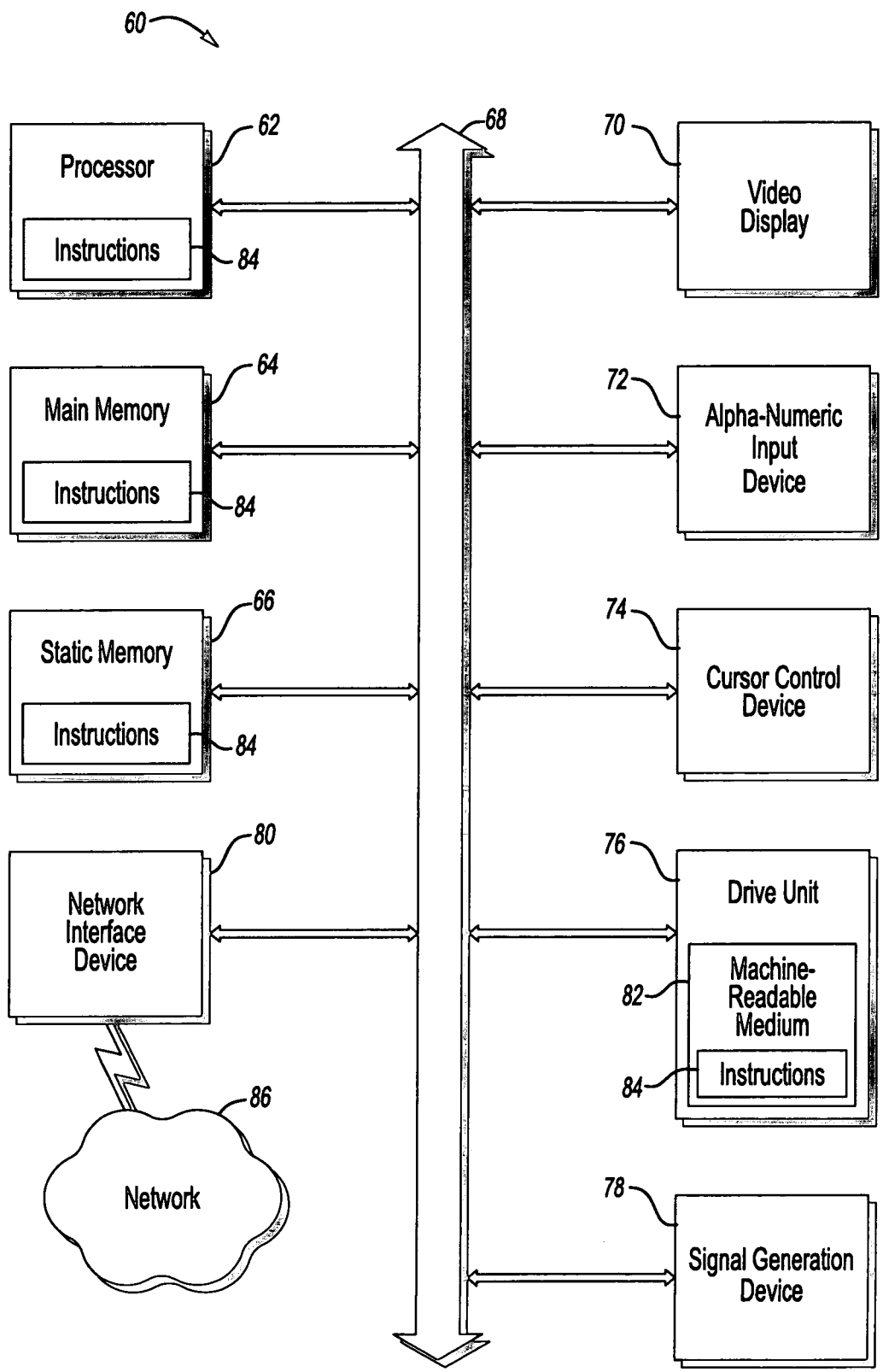
FIG. 3 illustrates a diagrammatic representation of a machine in accordance with one non-limiting aspect of the present invention.

FIG. 3 is a diagrammatic representation of a machine in the form of a computer system 60 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 60 may include a processor 62 (e.g., a central processing unit (CPU), a graphics processing unit (GPU), or both), a main memory 64 and a static memory 66, which communicate with each other via a bus 68. The computer system 60 may further include a video display unit 70 (e.g., a liquid crystal display (LCD), a flat panel, a solid state display, or a cathode ray tube (CRT)). The computer system 60 may include an input device 72 (e.g., a keyboard), a cursor control device 74 (e.g., a mouse), a disk drive unit 76, a signal generation device 78 (e.g., a speaker or remote control) and a network interface device 80.

The disk drive unit 76 may include a machine-readable medium 82 on which is stored one or more sets of instructions (e.g., software 84) embodying any one or more of the methodologies or functions described herein, including those methods illustrated in herein above. The instructions 84 may also reside, completely or at least partially, within the main memory 64, the static memory 66, and/or within the processor 62 during execution thereof by the computer system 60. The main memory 64 and the processor 62 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 84, or that which receives and executes instructions 84 from a propagated signal so that a device connected to a network environment 86 can send or receive voice, video or data, and to communicate over the network 86 using the instructions 84. The instructions 84 may further be transmitted or received over the network 86 via the network interface device 80.

While the machine-readable medium 82 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    connecting first and second routers to a network, wherein the first router has a first configuration profile stored therewith which specifies operation of the first router in the network, wherein the second router has a second configuration profile stored therewith which specifies operation of the second router in the network;
    connecting a management server to the network such that the management server is remotely located from the first and second routers and is in communication with the first and second routers via the network;
    retrieving, by the management server via the network, the first configuration profile from the first router after the first router has been operating in the network;
    retrieving, by the management server via the network, the second configuration profile from the second router after the second router has been operating in the network;

storing, at the management server, the retrieved configuration profiles in a database;

monitoring, by the management server via the network, the first router to determine whether the first router experiences a first fault condition resulting in restoration of the operation of the first router in the network being dependent upon the first router having access to a copy of the first configuration profile other than the first configuration profile stored therewith;

monitoring, by the management server via the network, the second router to determine whether the second router experiences a second fault condition resulting in restoration of the operation of the second router in the network being dependent upon the second router having access to a copy of the second configuration profile other than the second configuration profile stored therewith;

distributing the stored first configuration profile from the management server to the first router via the network in response to the first router experiencing the first fault condition to facilitate the correction thereof; and distributing the stored second configuration profile from the management server to the second router via the network in response to the second router experiencing the second fault condition to facilitate the correction thereof;

analyzing, by the management server, the retrieved configuration profiles for compliance with desired management characteristics; and manipulating, by the management server, non-compliant configuration profiles to comply with the desired management characteristics; comprising analyzing, by the management server, the retrieved configuration profiles for compliance with desired management characteristics; and comprising manipulating, by the management server, non-compliant configuration profiles to comply with the desired management characteristics.

2. The method of claim 1 further comprising distributing only stored configuration profiles in compliance with the desired management characteristics to the routers experiencing fault conditions.

3. A computer readable storage medium containing executable code that when executed causes a management server, connected to a network having a first router with a first configuration profile stored therewith which specifies operation of the first router in the network and a second router with a second configuration profile stored therewith which specifies operation of the second router in the network, to perform steps, the steps comprising:

retrieving the first configuration profile from the first router after the first router has been operating in the network;

retrieving the second configuration profile from the second router after the second router has been operating in the network;

storing the retrieved configuration profiles in a database;

monitoring the first router to determine whether the first router experiences a first fault condition resulting in restoration of the operation of the first router in the network being dependent upon the first router having access to a copy of the first configuration profile other than the first configuration profile stored therewith;

monitoring the second router to determine whether the second router experiences a second fault condition resulting in restoration of the operation of the second router in the network being dependent upon the second router having access to a copy of the second configuration profile other than the second configuration profile stored therewith;

distributing the stored first configuration profiles to the first router in response to the first router experiencing the first fault conditions to facilitate the correction thereof; and distributing the stored second configuration profile to the second router in response to the second router experiencing the second fault condition to facilitate the coffection thereof;

analyzing the retrieved configuration profiles for compliance with desired management characteristics; and manipulating non-compliant configuration profiles to comply with the desired management characteristics; comprise analyzing the retrieved configuration profiles for compliance with desired management characteristics; and comprise manipulating non-compliant configuration profiles to comply with the desired management characteristics.

4. The computer readable storage medium of claim 3 wherein the steps further comprise distributing only stored configuration profiles in compliance with the desired management characteristics to the routers experiencing fault conditions.

5. A method comprising:

connecting a router to a network, wherein the router has a configuration profile stored therewith which specifies operation of the router in the network;

connecting a management server to the network such that the management server is remotely located from the router and is in communication with the router via the network;

retrieving, by the management server via the network, the configuration profile from the router after the router has been operating in the network;

storing, at the management server, the retrieved configuration profile;

monitoring, by the management server via the network, the router to determine whether the router experiences a fault condition resulting in restoration of the operation of the router in the network being dependent upon the router having access to a copy of the configuration profile other than the configuration profile stored therewith; and distributing the stored configuration profile from the management server to the router via the network in response to the router experiencing the fault condition to facilitate the correction thereof;

analyzing the retrieved configuration profiles for compliance with desired management characteristics; and manipulating non-compliant configuration profiles to comply with the desired management characteristics; analyzing the retrieved configuration profiles for compliance with desired management characteristics; and manipulating non-compliant configuration profiles to comply with the desired management characteristics.

* * * * *

UNITED STATES PATENT AND TRADEMARK OFFICE
CERTIFICATE OF CORRECTION

PATENT NO. : 7,657,871 B2 Page 1 of 1
APPLICATION NO. : 11/187224
DATED : February 2, 2010
INVENTOR(S) : Manivannan Velupillai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1209 days.

Signed and Sealed this

Fourth Day of January, 2011

David J. Kappos
*Director of the United States Patent and Trademark Office*